No. 623,914. Patented Apr. 25, 1899.
W. KONRAD, Jr.
BICYCLE.
(Application filed Apr. 26, 1897.)
(No Model.)

WITNESSES
INVENTOR
William Konrad Jr.

UNITED STATES PATENT OFFICE.

WILLIAM KONRAD, JR., OF OSHKOSH, WISCONSIN.

BICYCLE.

SPECIFICATION forming part of Letters Patent No. 623,914, dated April 25, 1899.

Application filed April 26, 1897. Serial No. 633,923. (No model.)

*To all whom it may concern:*

Be it known that I, WILLIAM KONRAD, Jr., a citizen of the United States, residing at Oshkosh, in the county of Winnebago and State of Wisconsin, have invented certain new and useful Improvements in Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in bicycles; and the object of my invention is to provide a new and improved method for transmitting the power from the pedals to the driving-wheel.

Figure 1:
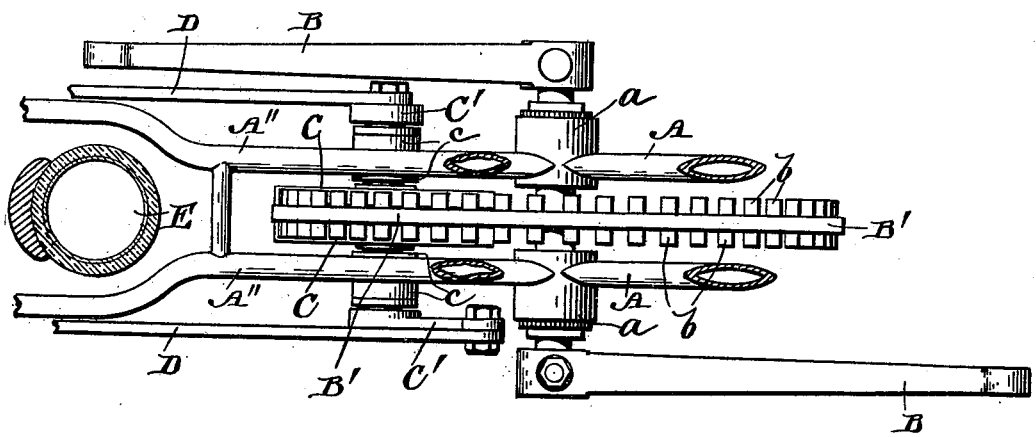
Figure 2:
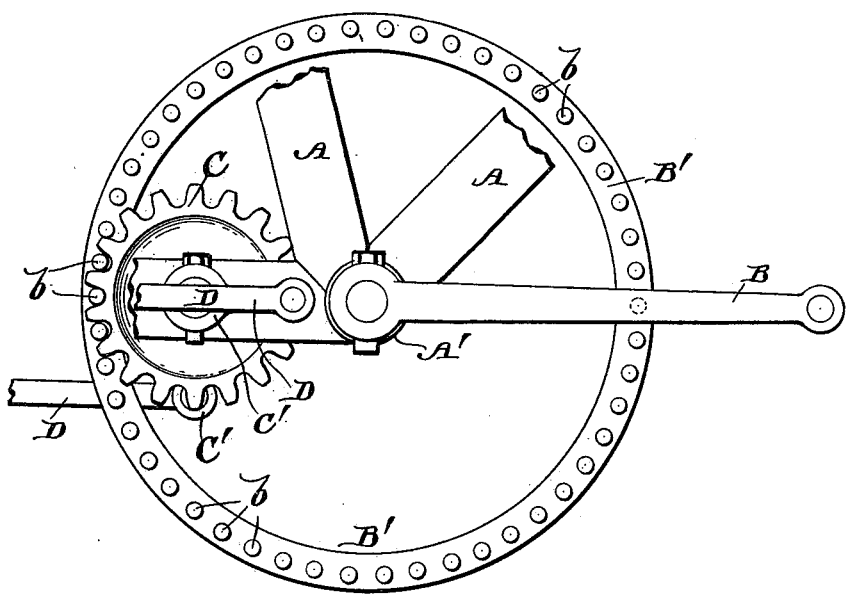

In the accompanying drawings, Figure 1 is a top view, and Fig. 2 a side view, of my invention.

Similar letters refer to similar parts in each view.

A A is the frame, supporting the crank-hanger A', and A'' A'' are the rear forks, extending horizontally from the crank-hanger.

B B are the cranks, which revolve the large wheel B'. The wheel B' is provided with laterally-extending pins $b$ $b$ $b$, &c., which engage the teeth upon the smaller sprocket-wheels C C on each side. The wheels C C revolve the cranks C' C', which are linked by means of links D D to the cranks revolving the rear wheel E of the bicycle. Ball-bearings $a$ $a$ are provided for the revolution of the shaft supporting the large wheel B', and the double bearings $c$ $c$ upon each side support the wheels C C; but the wheels C C are upon independent shafts and revolve independently of each other within the periphery of the large wheel B'. The power is thereby transmitted from the large wheel B' to the smaller wheels C C upon each side to revolve them independently of each other.

I am aware that bicycle-gears have heretofore been used wherein the pedal-actuated wheel was provided with an internal gear meshing into a smaller wheel, which revolved a single axle, operating cranks upon each side of the rear wheel of the bicycle; but in this method of transmitting power there was a side draft and the driving-cranks of the bicycle did not operate independently of each other. In my invention the wheels C C revolve upon a separate shaft and do not bind or antagonize each other. There is no side draft, the power being distributed equally upon both sides, and there is always a pressure of the pins $b$ $b$ against the teeth of either one or the other of the wheels C C, thereby preventing any noise or rattling and also providing against the binding of the gears. This method of arrangement provides a smooth and an equal and properly-balanced transmission of power.

Having now described my invention, what I claim as new, and desire to secure by Letters Patent, is—

1. In a bicycle, the combination with a suitable frame, having side bars, of crank-hangers formed in each side bar, a crank-shaft mounted in both of said hangers, a gear-wheel secured to the said shaft between the said side bars, pins secured to said gear-wheel and projecting laterally upon both sides thereof, independent shafts mounted in each of the side bars, pinions on the inner ends of said shafts and arranged upon opposite sides of the said gear-wheel so as to mesh with the pins upon the gear-wheel upon their inner surfaces, cranks on the outer ends of said shafts, and means connecting each of said cranks with the rear wheel for actuating the same, substantially as described.

2. In a bicycle, the combination with a frame, of a crank-shaft mounted therein, a gear-wheel having laterally-extending pins projecting on both sides thereof, the said wheel being mounted upon the said crank-shaft between the side bars of the frame, the said side bars extending upon each side of the said gear-wheel, crank-hangers carried by said bars and supporting the said crank-shaft upon each side of the gear-wheel, bearings mounted in each of the lower side bars of the frame to the rear of the crank-hangers, shafts mounted in each bearing and having at their inner ends pinions adapted to mesh with the pins upon the central gear-wheel, cranks secured to the outer ends of the said shafts, and means for connecting them with the hub of the drive-wheel for rotating the same, substantially as described.

3. In a bicycle, a pedal-shaft, a double internal gear mounted upon the pedal-shaft in the plane of the rear wheel, counter-shafts mounted in longitudinal alinement one on each side of the double internal gear, spur-gears upon the inner ends of the counter-shafts in mesh with the internal gears, cranks upon the rear axle and connecting-rods from the counter-shaft cranks to the rear-axle cranks, substantially as described.

In testimony whereof I affix my signature in presence of two witnesses.

WILLIAM KONRAD, Jr.

Witnesses:
F. J. McKenney,
George Simpson.